United States Patent [19]
Gonzales

[11] 3,857,496
[45] Dec. 31, 1974

[54] PLACEMENT ROBOT PROVIDING A VERTICAL AND HORIZONTAL DISPLACEMENT OUTPUT

[75] Inventor: J. Tim Gonzales, Carmel, Ind.

[73] Assignee: P. R. Mallory & Co., Inc., Indianapolis, Ind.

[22] Filed: Oct. 10, 1972

[21] Appl. No.: 296,292

[52] U.S. Cl.................... 214/1 BT, 74/23, 74/110, 214/1 BH
[51] Int. Cl.............................................. B66c 1/02
[58] Field of Search... 214/1 BD, 1 BH, 1 BB, 1 BT, 214/1 BC, 1 BV; 74/110, 23

[56] References Cited
UNITED STATES PATENTS

| | | | |
|---|---|---|---|
| 3,172,550 | 3/1965 | Caldwell | 214/1 BH X |
| 3,193,136 | 7/1965 | Stumpf | 214/1 BB X |
| 3,295,701 | 1/1967 | Alexander | 214/1 BB |
| 3,550,789 | 12/1970 | Jaeger | 214/1 BC |
| 3,757,961 | 9/1973 | Jacobs | 214/1 BB |

Primary Examiner—Robert J. Spar
Assistant Examiner—George F. Abraham
Attorney, Agent, or Firm—Charles W. Hoffmann; Robert F. Meyer; Donald W. Hanson

[57] ABSTRACT

A pick and placement robot for picking up a workpiece from a feed station and relocating the workpiece to an assembly line station through a single output shaft controlled by independent input means to selectively and sequentially control the vertical and horizontal movement of the output shaft.

6 Claims, 4 Drawing Figures

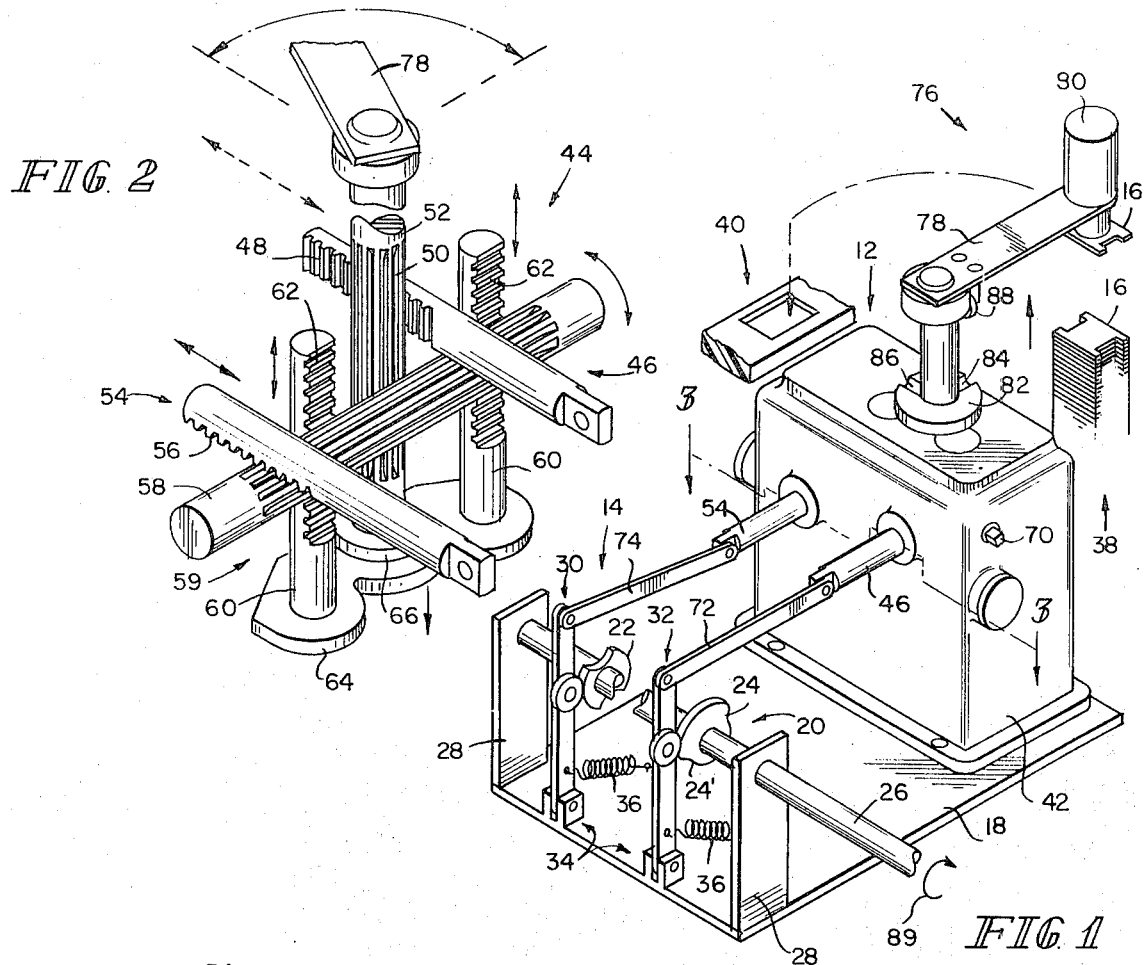
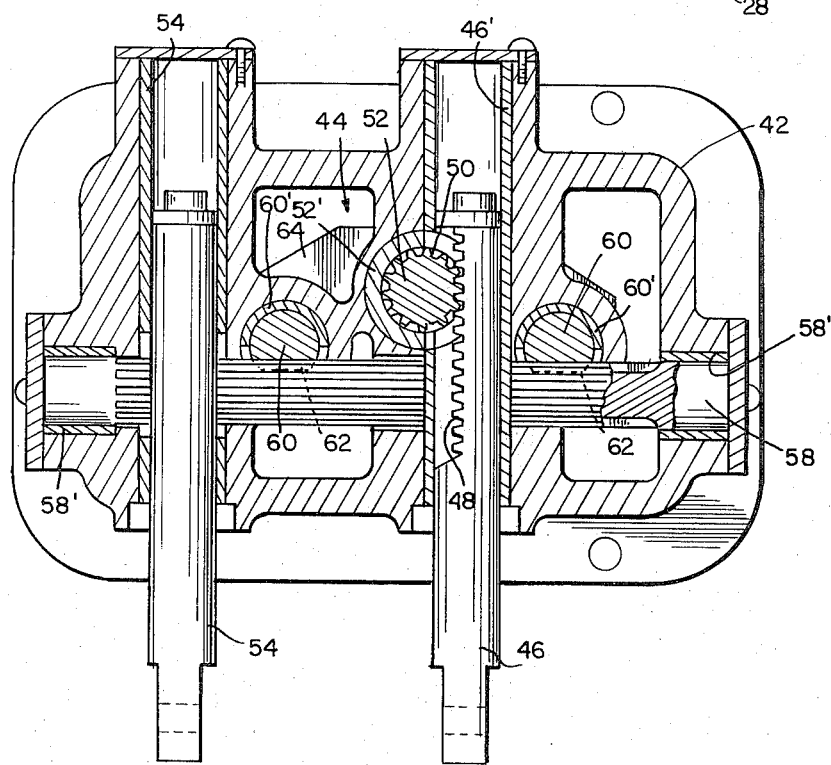

PLACEMENT ROBOT PROVIDING A VERTICAL AND HORIZONTAL DISPLACEMENT OUTPUT

The present invention relates to a mechanical device for transporting a workpiece from one station to a second station. More specifically the device disclosed herein is adapted to stimulate the motions of an operator on a production line when placing parts into an assembly. Furthermore the present invention will provide an instantly adjustable control input to provide an infinite amount of movement either independently or simultaneously in a vertical or horizontal plane. The motion conversion apparatus inside the housing is capable of extended life cycles and strong enough to withstand repeated cycling and heavy load burdens. The device is easily adapted to production machinery presently existing without major modifications. The present invention may be controlled by the various forms of input means which will allow it to operate independent of production line machinery or incorporate motions provided by the production machinery to produce a desired output.

It is therefore an object of the present invention to provide a workpiece positioning device capable of lifting a workpiece from one position to a second position.

It is another object of the present invention to provide a workpiece positioning device capable of lifting a workpiece from a first station and rotating the workpiece in a clockwise or counter-clockwise direction to a second station.

It is another object of the present invention to provide a workpiece positioning device capable of axial movement of an output shaft and rotational movement of the output shaft simultaneous or independent of each other through independently controlled inputs.

Another object of the present invention is to provide a program sequence control means for a workpiece positioning device so that a sequence of events may be controlled by a single input of a program means.

It is another object of the present invention to provide a workpiece positioning device with a mechanism wherein all moving parts are encapsulated in a lubricant.

Another objct of the present invention is to provide a workpiece positioning device with a detent means for positively locating an output shaft in any desired location.

It is another object of the present invention to provide a workpiece positioning device wherein an output shaft extends from a housing at right angles to that of control rods so that coupling to the control rods may be in a plane different from that of the output shaft.

Another object of the present invention is to provide a workpiece positioning device which is capable of 360° rotation independently or simultaneously with an axial movement which is determined by the length of an output shaft and the length of a rack carriage.

It is still another object of the present invention to provide a workpiece positioning device incorporation in a housing and having a single output shaft extending from the housing and a first and second control rack extending into the housing to be actuated external of the housing by a program sequence means so that the output shaft may rotate due to the first rack being engaged with a splined periphery on the output shaft and vertical movement of the output shaft being achieved through a rack carriage which is coupled to the output shaft and driven through a splined shaft lying in a plane transverse to the plane of the output shaft, with the splined shaft being rotated by the second control rack through meshing engagement therewith so that a work handling unit, when attached to the output shaft, may be displaced by the output shaft in an axial or rotational movement to produce a desired work operation.

Another object of the present invention is to provide a workpiece positioning device which is neat, compact and having an uncluttered exterior which will consume a small space in operation.

These and other objects will become more apparent from the following descriptions and accompanying drawings wherein:

FIG. 1 is a perspective view of a workpiece positioning device in combination with a pickup head and a sequential program control;

FIG. 2 is an isolated perspective view illustrating only the moving parts of the positioning device;

FIG. 3 is a cross sectional top view taken along line 3—3 of FIG. 1; and

Figure 4:
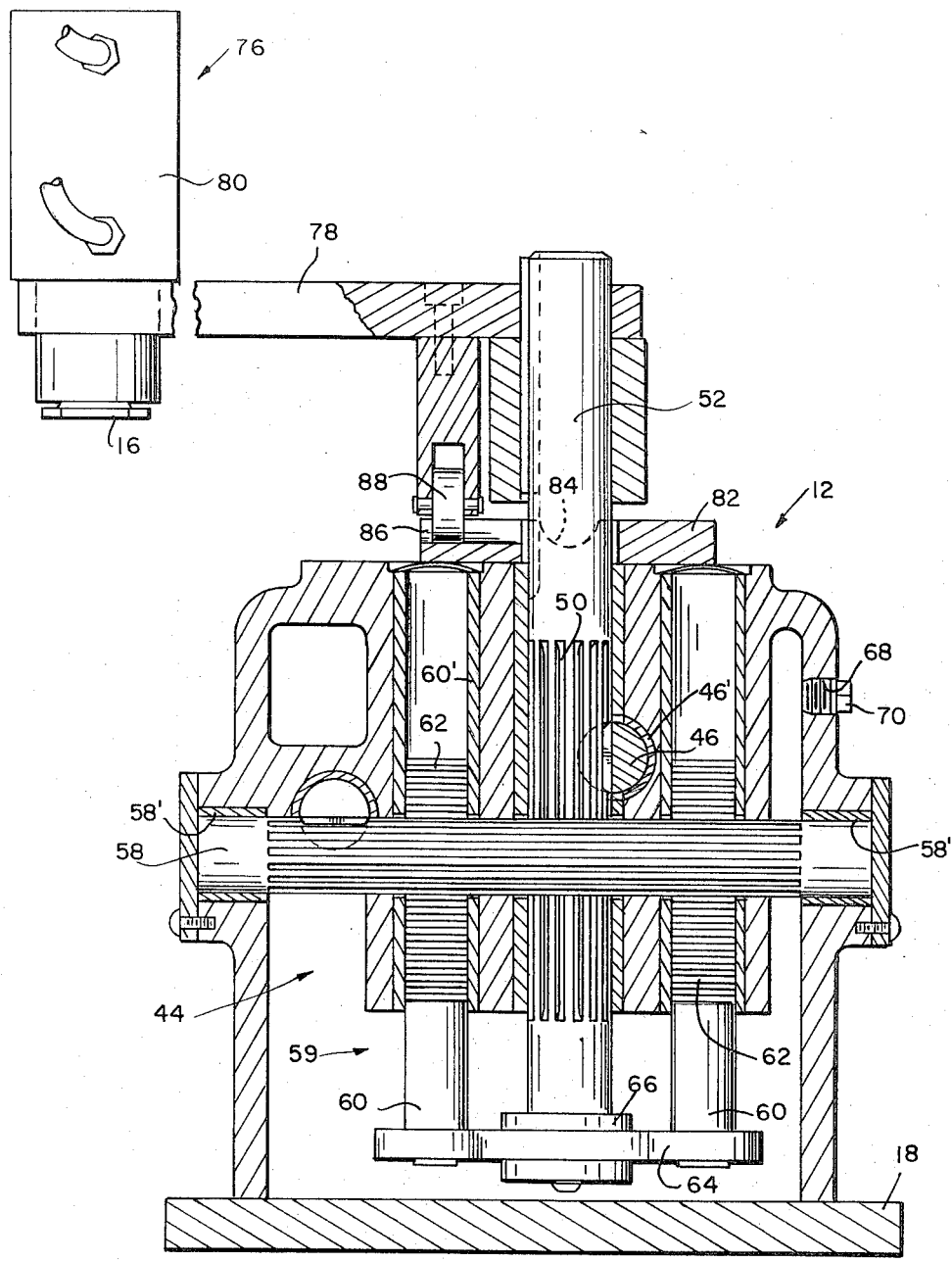
FIG. 4 is a side elevation, in section, of the workpiece positioning device.

Generally speaking, the objects of the present invention are accomplished through a workpiece positioning device having an enclosed housing with an output shaft extending out of the housing and first and second control racks projecting into the housing and responsive to a program sequencing means, so that when the first control rack is moved it will rotate the output shaft by way of a splined periphery on the output shaft, with the vertical motion of the output shaft being accomplished through a rack carriage located inside the housing and coupled to the output shaft for axial movement when the carriage is moved by a splined shaft lying transverse to the axis of the output shaft, with the splined shaft being driven by the second control rack so that by attaching a work handling means to the output shaft a function of picking up and releasing a workpiece through a vertical and rotational movement of the output shaft will be achieved.

Referring now to the drawings and more specifically to FIG. 1 the workpiece positioning device 10 includes a positioning mechanism 12 and a control means 14. Positioning mechanism 12 provides the mechanical movement required to relocate a workpiece 16 with control means providing a predetermined amount of travel for moving workpiece 16. Control means 14 and positioning mechanism 12 are rigidly secured to an alignment plate 18 to maintain proper alignment between them.

Control means 14 includes program means 20 provided by cams 22, 24 and input shaft 26. Cam 22 controls the amount of vertical movement of positioning mechanism 12 with cam 24 controlling the amount of horizontal movement of positioning mechanism 12. Input shaft 26 is rotationally coupled to cam 22 and 24 to rotate cams 22 and 24 simultaneously about a common axis. Input shaft 26 may be driven by a motor (not shown) or may be driven by other forms of prime movers such as indexing solenoids, fluid drive, a rack and pinion in combination with the machine to which the workpiece positioning device 10 is attached, or other types of drive means well known in the art. A pair of journals 28 rigidly attached to alignment plate 18 rotationally support input shaft 26. As program means 20 is rotated, a pair of program followers 30 and 32 are positioned to respond to the contours of cams 22 and 24 respectively. Program followers 32 and 30 are pivotally supported at 34 to alignment plate 18 and are resiliently held in engagement with their respective cams by way of tension springs 36 so as to be responsive to program means 20.

As illustrated in FIGS. 1–4, workpiece 16 is received from a pickup station 38 and relocated to a placement station 40 by way of positioning mechanism 12. Positioning mechanism 12 includes a housing 42 which supports motion conversion means 44, illustrated in an isolated view of FIG. 2. Motion conversion means 44 includes a first control rack 45 movable in a horizontal plane in the housing and provided with a flatened surface which has located therein a rack gear 48. Desirably, rack gear 48 is continuously in mesh with a splined periphery 50 on an output shaft 52. Spline 50 is provided so that as output shaft 52 moves axially it may be continuously in contact with rack gear 48 to rotate in response to movement of first control rack 46. When first control rack 46 is restrained from moving, rack gear 48 wil serve as a key to restrict any rotationaly movement of output shaft 52.

Motion conversion means 44 also provides axial movement of output shaft 52 through a vertical plane. This is accomplished by second control rack 54 imparting rotational motion to a splined shaft 58 through a rack gear 56. Splined shaft 58 lies in a plane transverse to the axis of output shaft 52 to drive a carriage means 59. Carriage means 59 includes a yoke 64 and a pair of vertical racks 60 which are in meshing engagement with splined shaft 58 through a rack gear 62. Movement of racks 60 will transmitt motion to output shaft 52 through yoke 64. Yoke 64 is rigidly coupled to the vertical racks 60 and axially coupled to output shaft 52, with rotational movement of output shaft 52 being permitted through a thrust bearing 66. It may be seen in FIG. 2 that horizontal movement of second control rack 54 will impart rotational movement to splined shaft 58. Splined shaft 58, when rotated, imparts a vertical motion to carriage means 59 through racks 60 to axially move output shaft 52 through bearing 66 and yoke 64. Rotational movement of output shaft 52 by way of first control rack 46 and vertical movement of output shaft 52 through second control rack 54 may be achieved simultaneously or independently of each other.

To assure proper alignment and extended wear characteristics, housing 42 supports a plurality of bushings for the motion conversion means 44. Accordingly, and with particular reference to FIG. 3, motion conversion means elements 46, 54, 58, 60, and 52, are supported in bushings 46', 54', 58', 60', and 52', respectively. A fluid lubricant (not shown) may be introduced into aperture 68 (FIG. 4) to be closed by a service plug 70 to maintain a lubricating environment for motion conversion means 44. It should be understood that housing 42 is sealed, by means known in the art, to prevent leakage of any of the liquid lubricant.

Controlled movement of first and second control racks 46 and 54 to produce a desired movement of the output shaft, may be accomplished through a pair of linkage arms 72 and 74 connecting positioning mechanism 12 to control means 14. First control rack 46 is connected to program follower 32 through linkage 72 to provide a desired horizontal movement of output shaft 52 from program cam 24. Linkage 74 is connected between second control rack 54 and program follower 30 to provide a predetermined amount of movement to second control rack 54 so as to provide a desired vertical movement of output shaft 52.

The present invention provides a simple economical and efficient material handling device which may be incorporated into existing production equipment without changing the geometry inside the device to provide a vertical and horizontal movement either independent or simultaneous of each other. Thus having provided a motion conversion means 44 to produce vertical and rotational movement of output shaft 52, it is convenient to attach to output shaft 52 a work handling means 76 to produce a desired work operation. Output shaft 52 has attached thereto for rotational and axial movement thereby a cantilevered arm 78. Work handling means 76 is illustrated in the present disclosure to represent a vacuum pickup head 80. Work handling means 76 may take the form of a drill, clamp screw, driving head, or any other form of work producing heads known in the art. As vacuum head 80 comes in contact with workpiece 16, at work pickup station 38, vacuum pickup head 80 may be controlled to pneumatically attach workpiece 16 thereto for transporting and depositing the workpiece 16 at placement station 40. A positive location of output shaft 52 at stations 38 and 40 may be achieved by securing a detent ring 82 to the uppermost portion of housing 42 and positioned so that a pair of detents 84 and 86 are in proper alignment with pickup station 38 and placement station 40, respectively. A positioning roller 88 located on the arm 78 will be allowed to roll into detents 84 and 86 to assure positive and accurate location of the arm 78. Ring 82 may be replaced with a face cam (not shown) to aid in vertical movement of output shaft 52 during its rotational movements through roller 88.

OPERATION

In an assembly line it is desirable to pickup a workpiece 16 from a pickup station 38 and transport workpiece 16 to placement station 40 in the assembly line, to thereby feed the assembly line a desired amount of parts in a specific location. Workpiece positioning device 10 is capable of relocating workpiece 16, from pickup station 38 to placement station 40 with such station being a station on an assembly line, through positioning means 12 which is controlled by control means 14. As shaft 26 is rotated in the direction of arrow 89 program means 20, including cams 22 and 24, will rotate therewith to impart motion to their respective program followers 30 and 32. As the free ends of program followers 30 and 32 are moved, the linkage arms 72 and 74 will impart motion to the first and second control rack 46 and 54, respectively.

As shown in FIG. 1 the mode of operation of the workpiece positioning device 10 is at a position wherein second control 54 rack has caused output shaft 52 to move upwardly and work handling means 78 has lifted one of the workpieces 16 from work pickup station 38. Program cam 22 will hold second rack 54, through the linkage bar 74 and program follower 30 in the illustrated axial position as drive shaft 26 continues to rotate. Upon continued rotation of drive shaft 26, program follower 32 will be allowed to drop onto lower level 24' on the program cam 24 to move control rack 46 into housing 42, and thus rotate output shaft 52 through rack gear 48 and splined periphery 50. Pickup head 80 connected to output shaft 52 will be rotated from the position as viewed in FIG. 1 to align over placement station 40. As drive shaft 26 continues to rotate, cam 22 will impart motion to program follower 30 to move the second control rack 54 into housing 42 by the way of the linkage 74. Second control rack 54 will impart motion to splined shaft 58 through rack gear 56 on second control rack 54. Rotation of splined shaft 58 will impart motion to the carriage means 59, through vertical racks 60, to axially move output shaft 52 into housing 42 to locate workpiece 16 at a proper level at placement station 40. Accurate location of the placement head 80 at station 40 is achieved through roller 88 dropping into detent 86 of detent ring 82.

To relocate pickup head 80 from the placement station 40 to the pickup station 38 in order to secure a second workpiece 16 to be placed into the assembly line, the aforementioned sequences of events will be reversed in response to continued rotation of shaft 26. With position pickup head 80 back in contact with a stack of workpieces 16 at pickup station 38, the aforementioned cycle may be repeated.

The present invention provides a rotational and axial output of an output shaft by way of independent vertical and horizontal control input when actuated by a predetermined control means. By attaching various forms of work producing heads and variations in the leakage mechanism attached to the output shaft the range of capabilities of the positioning mechanism is limited only to the length of the output shaft, vertical control rack 54 and the carriage assembly means 59.

What is claimed is:

1. A workpiece handling device including:
   a. a housing,
   b. a single output shaft extending from said housing,
   c. first and second control racks supported by said housing and responsive to a control means,
   d. said output shaft rotationally responsive to said first rack through a splined periphery on said output shaft,
   e. a rack carriage disposed in said housing,
   f. said output shaft axially moved by said rack carriage,
   g. said rack carriage responsive to a splined shaft lying in a plane transverse to said output shaft,
   h. said splined shaft responsive to said second control rack, and
   i. a work handling means coupled to said output shaft to be displaced axially and rotationally thereby.

2. A workpiece handling device according to claim 1 wherein said control means includes a pair of cams driven by a common input shaft.

3. A workpiece handling device according to claim 2 wherein said common input shaft is rotated by a motor.

4. A workpiece handling device according to claim 1 wherein said output shaft is in a plane normal to that of said control racks.

5. A workpiece handling device according to claim 1 wherein said housing contains a liquid lubricant.

6. A device according to claim 1 wherein said work handling means is a pneumatic pickup and release head.

* * * * *

UNITED STATES PATENT OFFICE
CERTIFICATE OF CORRECTION

PATENT NO. : 3,857,496
DATED : 12/31/74
INVENTOR(S) : J. Tim Gonzales

It is certified that error appears in the above-identified patent and that said Letters Patent are hereby corrected as shown below:

Col. 1, line 7 delete "stimulate" and substitute therefore --simulate---

Col. 1, line 45, delete "objct" and substitute therefore ---object---

Col. 1, line 66, delete "and" and substitute therefore --with--

Col. 2, line 48, insert ---14---after "means"

Col. 3, line 23, delete "wil" and substitute therefore ---will---

Col. 4, line 9 delete "provide" and substitute therefore ---produce---

Col. 4, line 59, delete "54 rack" and substitute therefore ---rack 54---

Signed and sealed this 20th day of May 1975.

(SEAL)
Attest:

RUTH C. MASON
Attesting Officer

C. MARSHALL DANN
Commissioner of Patents
and Trademarks